Dec. 24, 1963  H. M. SADWITH  3,115,144
INDUSTRIAL WASHING MACHINE
Filed July 7, 1961  7 Sheets-Sheet 1

INVENTOR.
HOWARD M. SADWITH
BY
*Kenyon & Kenyon*
ATTORNEYS

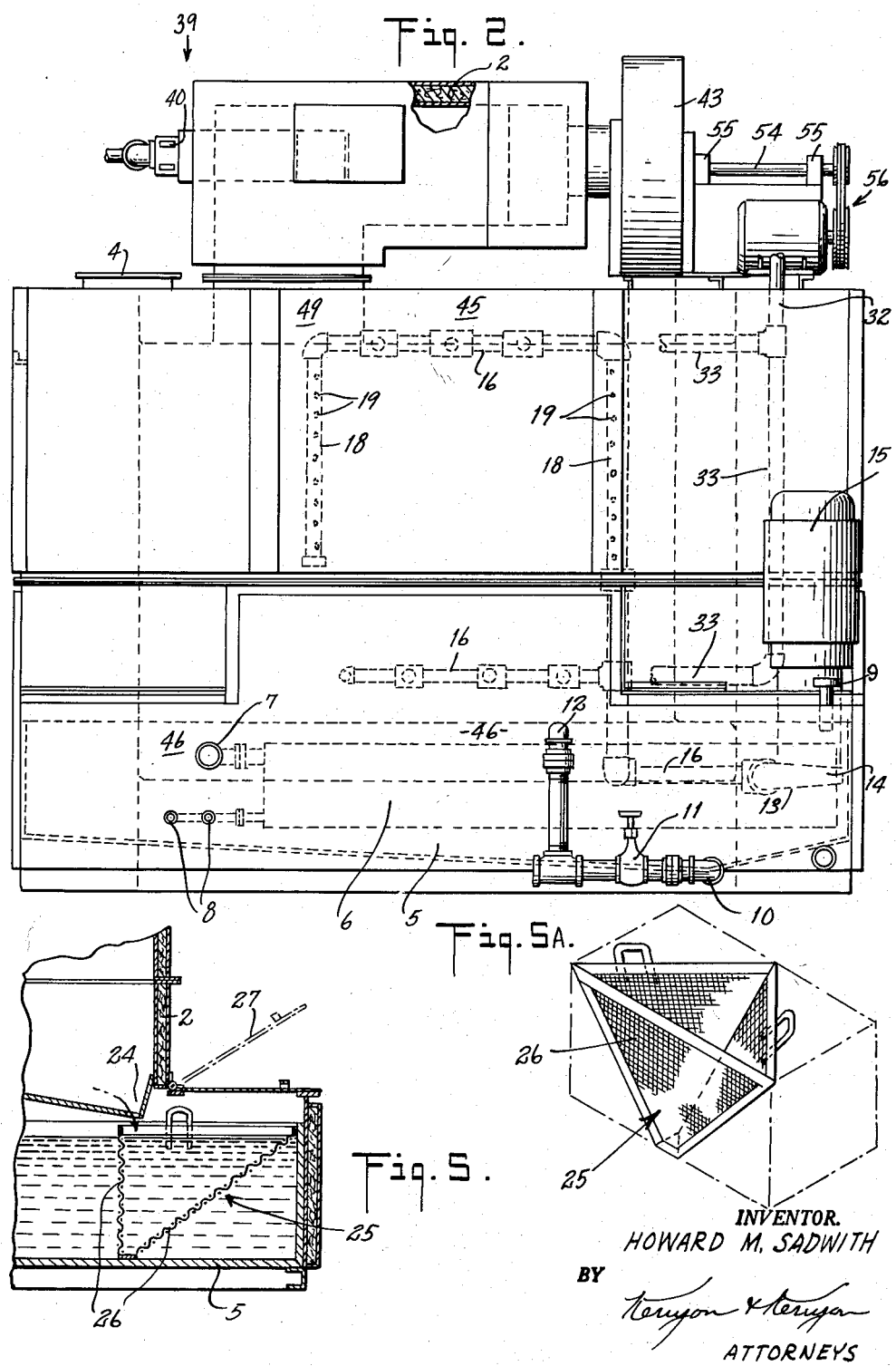

INVENTOR.
HOWARD M. SADWITH
BY
ATTORNEYS

Dec. 24, 1963 H. M. SADWITH 3,115,144
INDUSTRIAL WASHING MACHINE
Filed July 7, 1961 7 Sheets-Sheet 4

INVENTOR.
HOWARD M. SADWITH
BY
ATTORNEYS

Dec. 24, 1963　　　H. M. SADWITH　　　3,115,144
INDUSTRIAL WASHING MACHINE
Filed July 7, 1961　　　　　　　　　　　　7 Sheets-Sheet 5
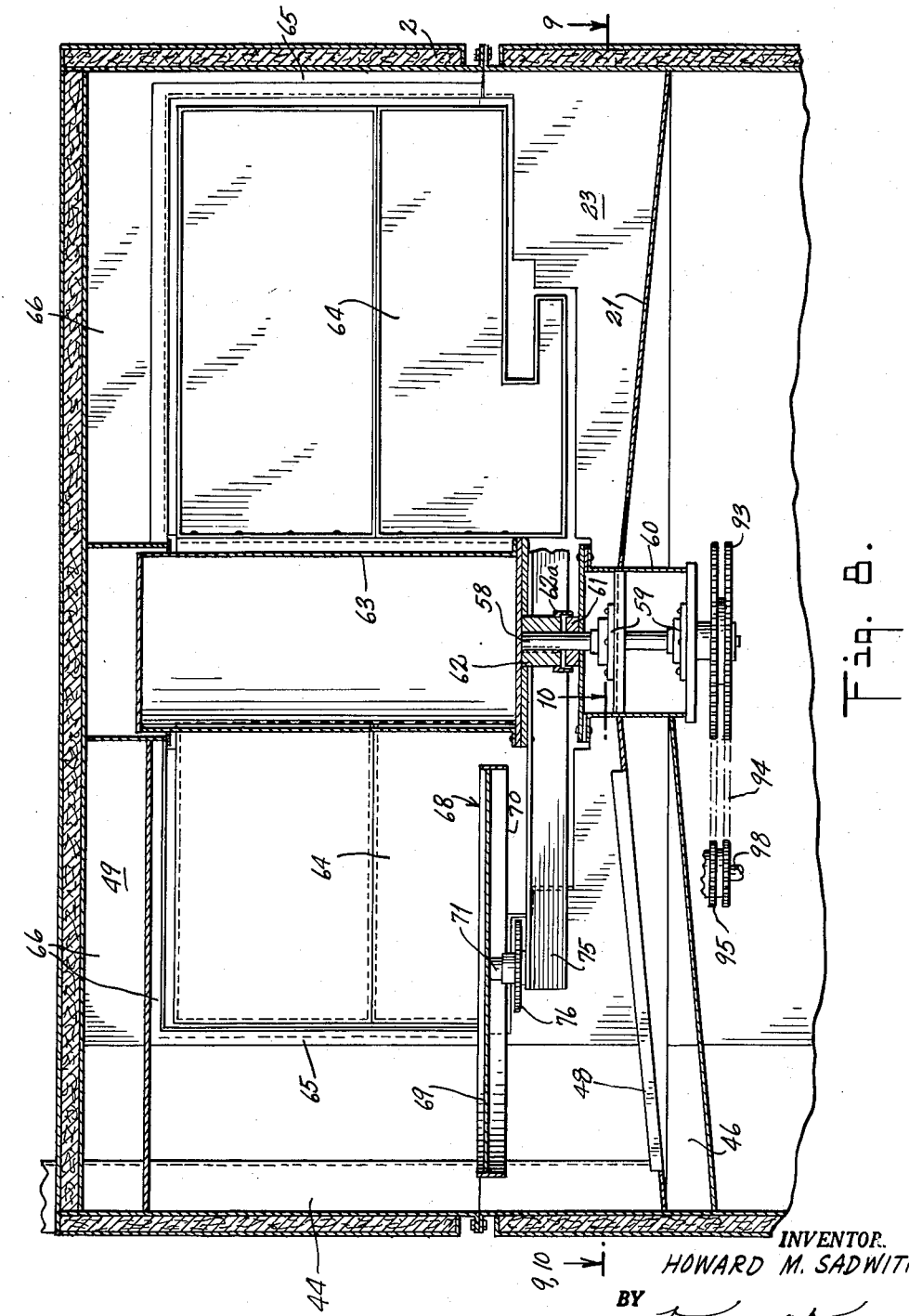
Fig. 8.
INVENTOR.
HOWARD M. SADWITH
BY
ATTORNEYS Dec. 24, 1963 H. M. SADWITH 3,115,144
INDUSTRIAL WASHING MACHINE
Filed July 7, 1961 7 Sheets-Sheet 6

INVENTOR.
HOWARD M. SADWITH
BY
ATTORNEYS

Dec. 24, 1963 H. M. SADWITH 3,115,144
INDUSTRIAL WASHING MACHINE
Filed July 7, 1961 7 Sheets-Sheet 7

INVENTOR.
HOWARD M. SADWITH
BY
Kenyon & Kenyon
ATTORNEYS została # United States Patent Office 3,115,144
Patented Dec. 24, 1963

3,115,144
INDUSTRIAL WASHING MACHINE
Howard M. Sadwith, Plainfield, N.J., assignor to Industrial Washing Machine Corporation, Matawan, N.J., a corporation of New Jersey
Filed July 7, 1961, Ser. No. 122,472
5 Claims. (Cl. 134—58)

This invention relates to machines for washing substantially rigid articles and parts in industry, which are, for example, especially suited for cleaning bread, cake, and pie-baking pans and other utensils in a commercial bakery.

The washing machines embodying this invention can handle a large volume of utensils and other articles, yet they are compact and economical both to install and to operate.

They make it commercially practicable to wash, rinse, and dry utensils or other parts in one machine, without rehandling. An operator is required only to load dirtied articles, and to unload them after they have been cleaned and dried. This manual operation may be performed while the machine is engaged in washing, rinsing and drying articles which have been previously loaded.

Other novel features and advantages of this invention will be apparent to those men skilled in this art from the following specification and accompanying drawings, wherein:

FIG. 2 is a right side elevation of the washing machine shown in FIG. 1.

FIG. 5 is a detail sectional elevation taken generally along line 5—5 in FIG. 3.

FIG. 5A is a drawing of a portion of the structure shown in FIG. 5.

FIG. 8 is a sectional elevation taken generally along line 8—8 in FIG. 6.

Figure 1:
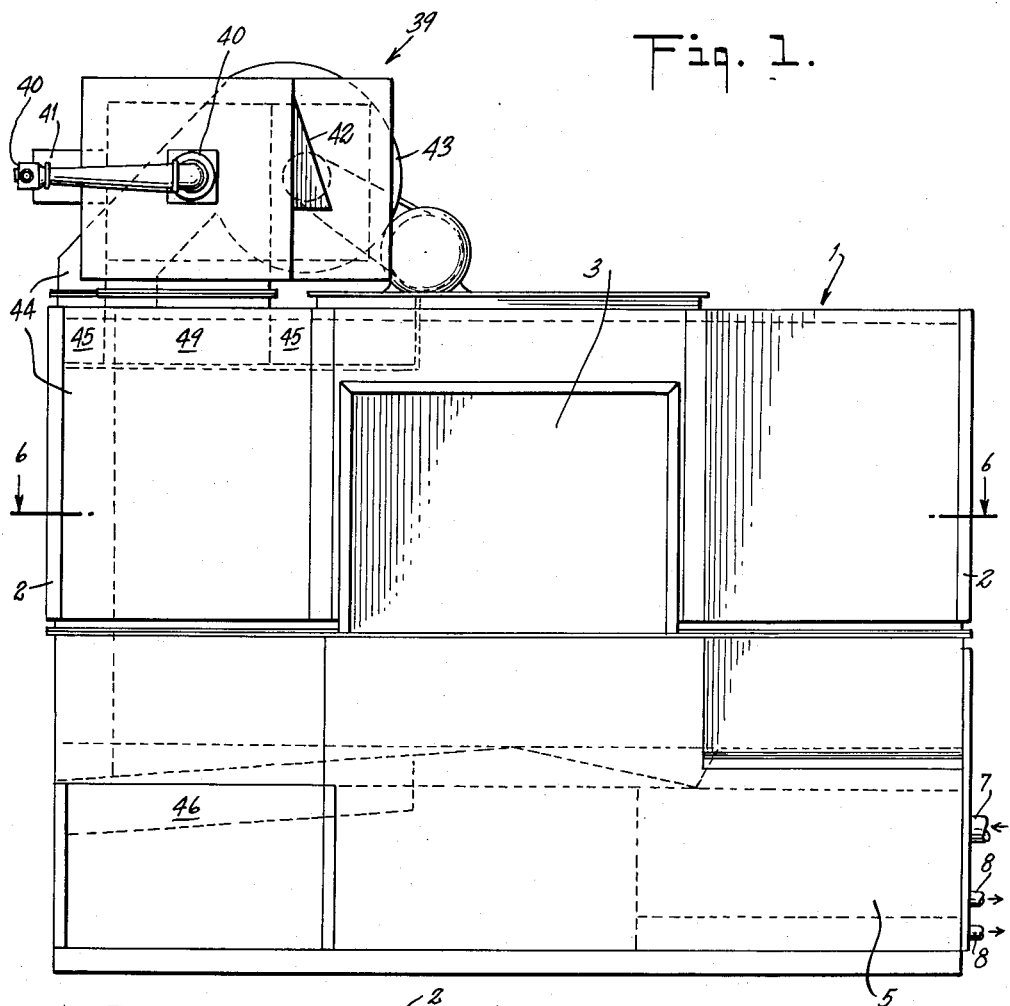
FIG. 1 is a front elevation of a washing machine embodying this invention.
Figure 4:
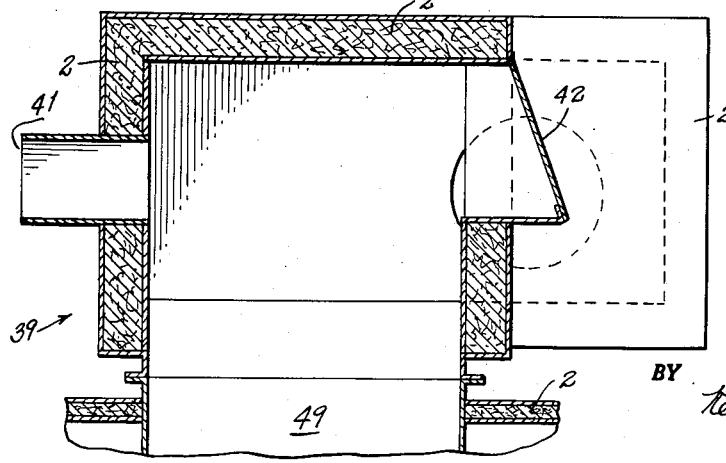
FIG. 4 is a detail view taken generally along line 4—4 in FIG. 3.

The industrial washing machine which is described in greater detail below is an integrated unit which automatically washes, rinses and dries utensils by successively locating them in loading (and unloading), washing, rinsing and drying compartments which operate simultaneously but independently of each other. In other words, because the washing, rinsing and drying operations are independent one may be performed in one compartment while another is performed in another compartment. Such simultaneous—if not coextensive—operation is an advantage whether the operations are continued for exactly the same length of time or whether one operation, e.g. washing, is continued a little longer than another operation, e.g. rinsing. These operations take place within an insulated housing which eliminates the usual overheated and steamy atmosphere of the cleaning room, particularly since the utensils are fully dried before they are removed from the machine.

A housing and frame 1 generally encloses and supports the washing machine parts. It may be made in a number of pieces and sub-assemblies which are then fitted together as shown, or as is otherwise convenient. Insulation 2 in a double wall construction of the outside surfaces of this housing conserves heat for the washing, rinsing and drying operations and prevents overheating of the room in which the washer is installed.

The utensils, which may lie in trays, are loaded through a table height opening 3 in the front of the machine onto a platform located in loading-unloading compartment 67d. Above this platform there is a vent 4 adapted for connection to an exhaust system. This exhaust, and the fact that the loading-unloading compartment is separated from the rest of the machine, eliminates the need for a door on the loading opening 3.

The platform forms a part of a utensil transport system which carries the utensils to the washing, rinsing and drying compartments. The operation in each of these compartments will be separately described as a preliminary to a description of the utensil transport, the compartments themselves and the automatic control system.

A tank or receptacle 5 for a washing solution or liquid is located in the bottom portion of the housing and contains heating coils 6 with steam inlet 7 and condensate returns 8. This tank is filled through inlet pipe 9, and drained through outlet pipe 10 past drain valve 11. An overflow 12 is connected to the same drain.

The washing solution is drawn from the tank through suction opening 13 of a centrifugal or other circulating pump 14 which is powered by an electric motor 15. The wash liquid is supplied from the pump and through supply pipes 16 to horizontal and vertical pipes 17 and 18, respectively, which hold nozzles 19. These nozzles apply the wash liquid as a spray to the utensils in the washing compartment 67a from all sides as they are rotated on a supporting platform.

As the washing solution falls from the rotating utensils, it is returned by trough 21 bounded by dividers 22 and 23 through drain opening 24 onto the strainer basket assembly 25 which encloses a corner portion of tank 5 with a fine mesh screen 26. A hinged cover 27 allows the strainer basket to be removed so that both it and the tank 5 may be cleaned. A strainer may also be provided between suction opening 13 and the rest of the tank to protect pump 14. Another hinged cover 28 provides access to the tank 5, drain 10, the overflow 12 and, if one is used, to the suction strainer.

A fresh water rinse solution or liquid is supplied from a heater (not shown) to inlet 29, valves 30 and 31 and through piping 32 to pipes 33 which contain nozzles 34 that apply a rinse liquid as a spray to the utensils as they are rotated on the platform in the rinsing compartment 67b. Alternatively, a recirculatory rinse solution system similar to the one described for the washing solution may be substituted for the fresh water rinse, either entirely or as a preliminary rinse before a final fresh water rinse. If rinsing is relatively unimportant for a particular job, wash water can be recirculated in place of recirculated rinse water to increase the time of washing or a second wash station could be incorporated in the machine in which cleaning operations are carried out simultaneously at different stations provided within the housing of an integrated automatic washer and in which the number of such stations or compartments is not the essential point.

A trough 35 bounded by dividers 23 and 36 catches the rinse water and carries it to drain inlet 37 which is connected to drain pipe 38.

Figure 3:
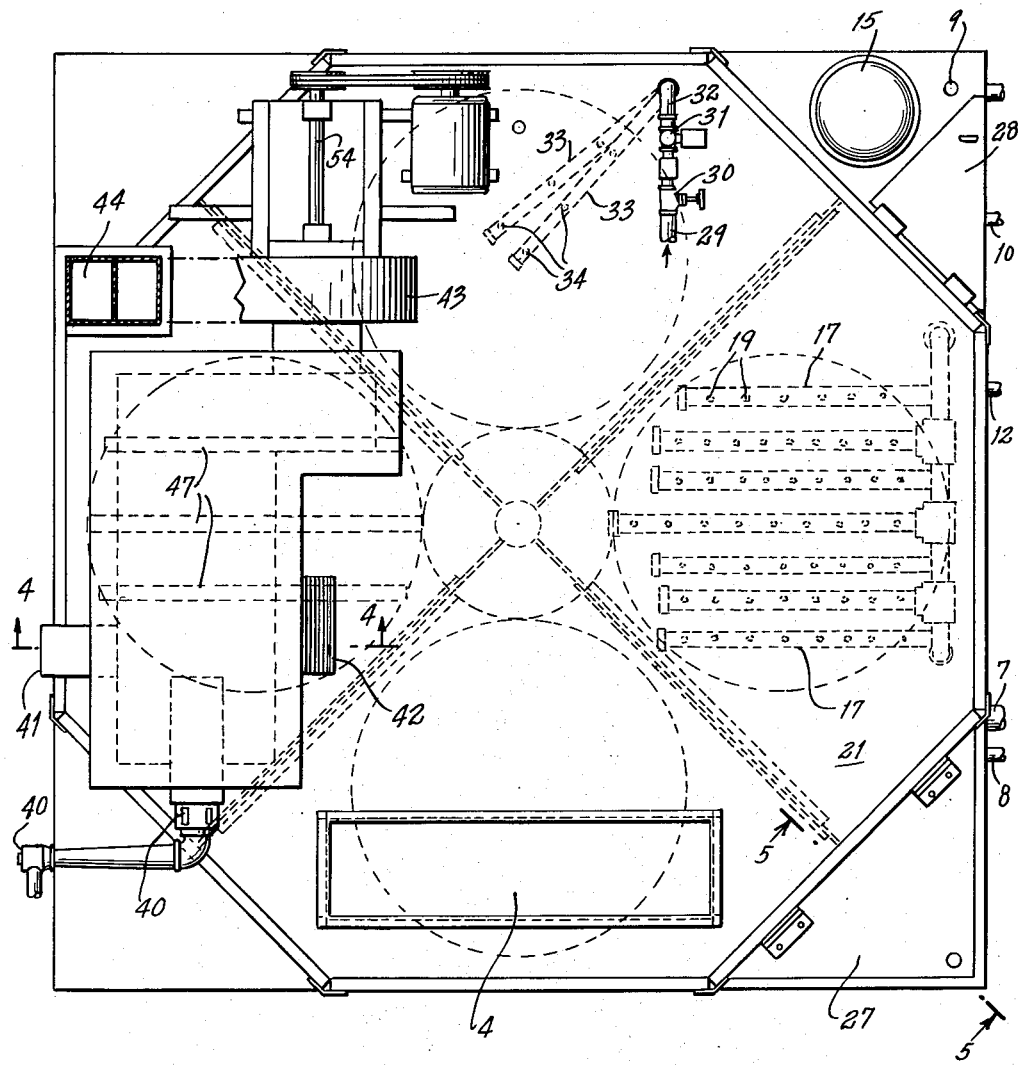
FIG. 3 is a top view of the same machine.

An Eclipse injector-type burner and heater assembly 39 is mounted on the top left portion of the housing 1 as shown in FIGURES 1 and 3. Air is supplied to the combustion chamber and burner through inlets 40, and additional fresh air for circulation may be supplied as desired through inlet 41. A normally closed explosion door 42 is provided for safety, and in addition it permits inspection of the burner while it is in operation.

A centrifugal blower 43 circulates air from the heater through the drying compartment 67c for turbulent circulation over the articles and parts, which are rotated within it on a supporting platform. This blower draws hot air from the combustion chamber and supplies it under pressure to duct 44, which carries the air to plenum or enclosure 45 which is formed over the drying compartment by partitions 66 and from which the air is directed onto the articles by nozzles 47 formed in its bottom. Duct 44, by an extension, also carries the heated air to enclosure 46, which is formed by dividers 36 and 49 under the drying compartment and from which air is upwardly directed over the articles by nozzles 48.

The drying air is largely recirculated to the heater through return duct 49 and its intake at the top of the drying compartment. But air to the burner and added fresh air cause a discharge of moisture-laden air from the drying compartment into the loading and unloading compartment where it is removed by the exhaust system connected to vent 4.

A drainboard 50, bounded by dividers 36 and 49a carries any water from the utensils to drain inlet 51 connected to drain pipe 38. The nozzles 48 are formed in this drainboard and rise sufficiently above it to prevent water from entering enclosure 46.

The blower 43 is mounted on housing 1 and is powered through shaft 54 which is journaled by bearings 55 and driven by motor pulley and belt assembly 56.

A drainboard 53 underlies the loading and unloading area, and carries any spillage or drippings to drain 38a which connects with drain pipe 38.

The utensil transport system is built around a central turntable 57. Its centrally located vertical drive spindle 58 is rotatably journaled in bearings 59 which are adapted to take downward as well as radial thrust. These loads are transmitted to waterproof frame box 60 which is mounted to the housing. The spindle 58 passes through a block 61, sealing attached to frame 60, and is keyed to block 62 which is fastened to the bottom plate of a hollow turntable drum 63 which is one suitable construction for the upper extension of spindle 58. A strip of flexible heat resistant rubber or plastic 62a is sealing secured around the lower edge of block 62 and extends downward to overlap the top side edge of block 61 and keep the wash or rinse liquids from entering the frame 60 around the spindle opening. Troughs or drainboards 21, 35, 50 and 53 are sealing joined to frame 60 along their inner perimeter.

Figure 6:
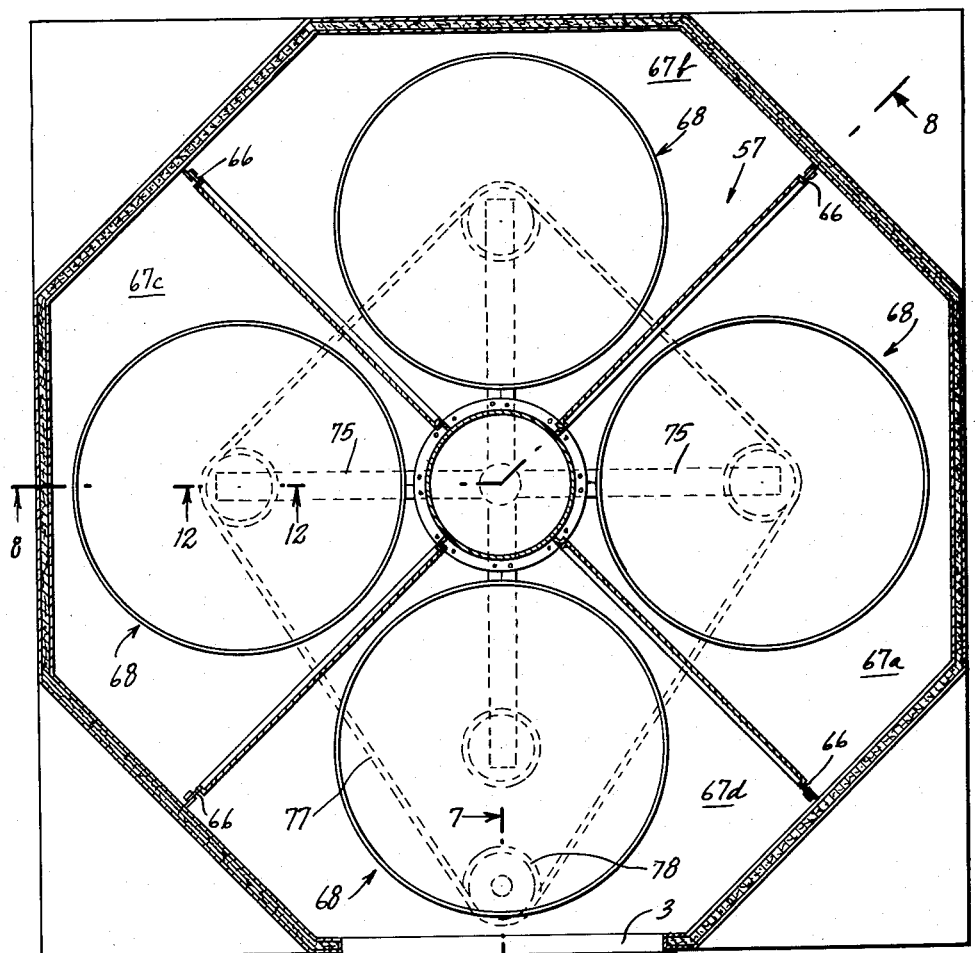
FIG. 6 is a sectional view taken generally along line 6—6 in FIG. 1.
Figure 7:
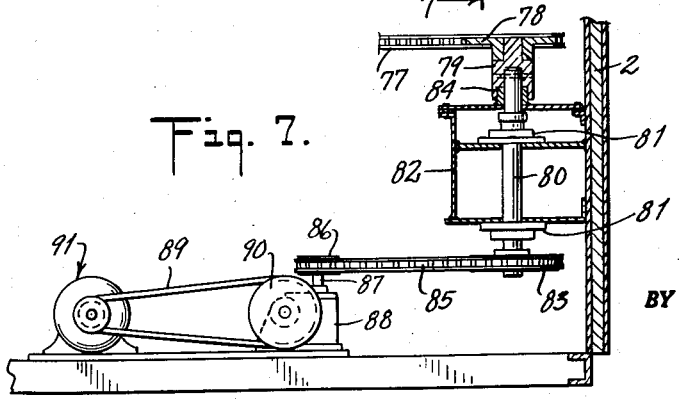
FIG. 7 is a detail sectional elevation taken generally along line 7—7 in FIG. 6.
Figure 9:
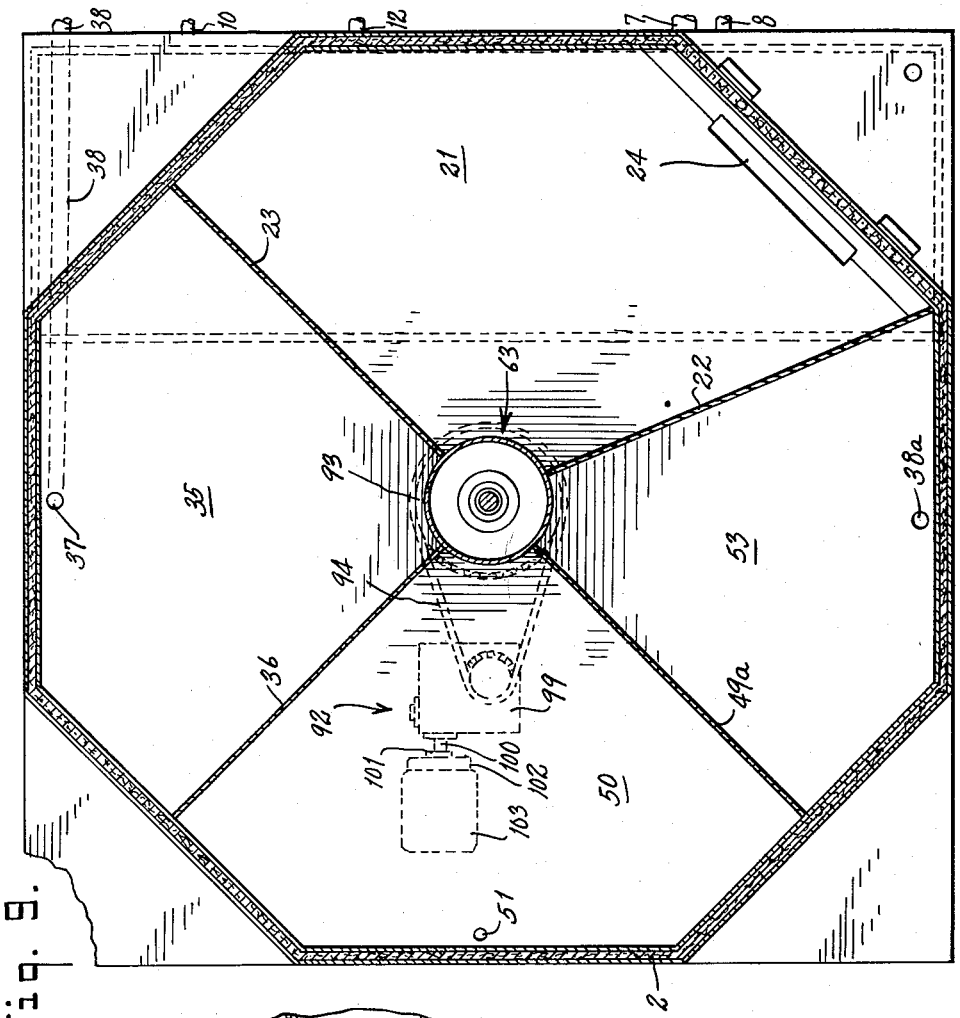
FIG. 9 is a sectional view taken generally along line 9—9 in FIG. 8.
Figure 10:
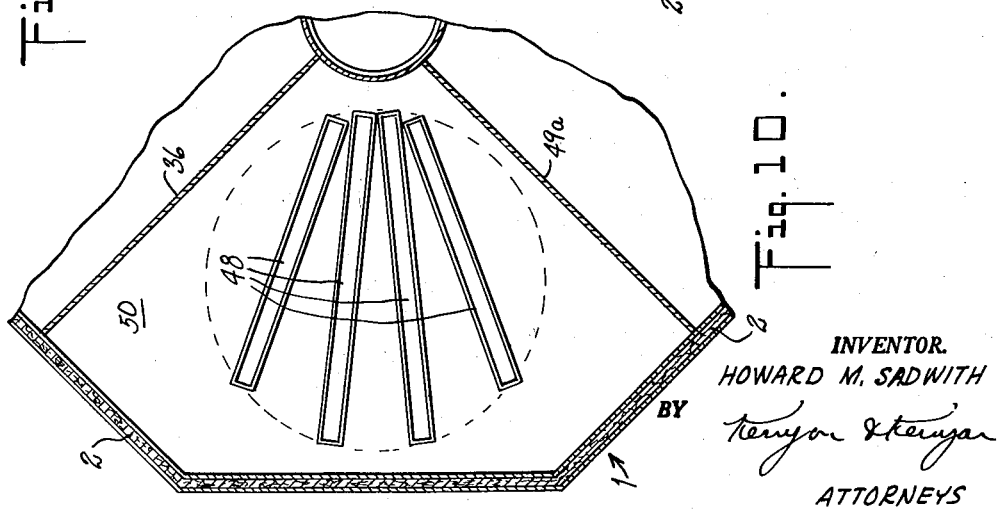
FIG. 10 is a detail sectional view of a portion of FIG. 9 taken generally along line 10—10 in FIG. 8.
Figure 11:
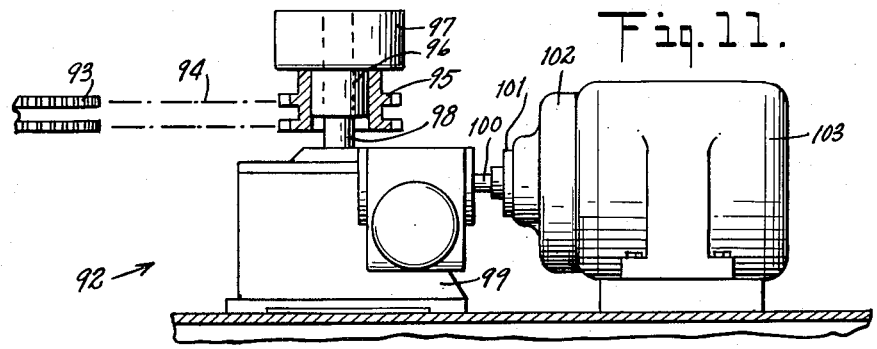
FIG. 11 is a sectional elevation of the index drive for the FIG. 1 machine.
Figure 12:
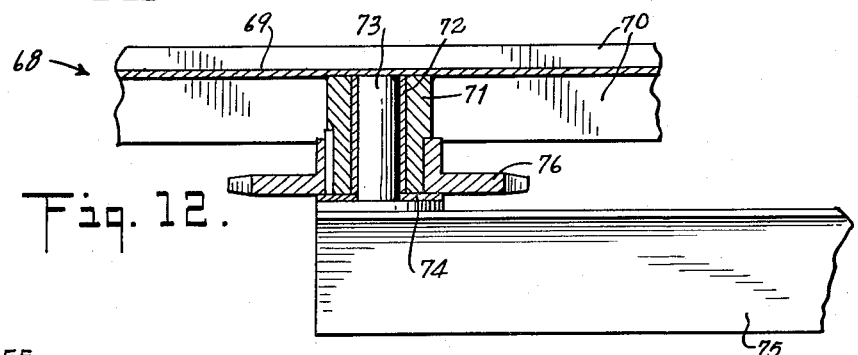
FIG. 12 is a detail sectional elevation of a portion of FIG. 8 taken generally along line 12—12 in FIG. 6.

The turntable 57 includes four bulkheads 64, set at 90° intervals, which are carried on the spindle. They may be conveniently fabricated of sheet metal in two panels as shown in FIG. 8. Side and top partitions 65 extend inward from the sides and top of the housing 1 to mate with the bulkheads when the turntable and drum or spindle are indexed or positioned as shown in FIG. 6, and to thus form four separate compartments, 67a, 67b, 67c and 67d, one generally over each of the four previously described troughs and drainboards 21, 35, 48 and 53, respectively. Each partition carries along its inner edge a strip of flexible heat and moisture resistant material 66, such as neoprene, which forms a seal between the partitions and the top and outer bulkhead edges.

The central turntable also includes platforms 68 suitable for holding utensils which are supported about the spindle midway between each bulkhead and thus one platform is in each of the compartments 67 when the turntable and spindle are indexed to one of the four operating positions. Each platform comprises a frame supported coarse screen surface 69 bounded by a metal rim 70 and is dimensioned to just fit into the compartments 67. It is secured to the top of a hub 71 which carries a bearing 72 by which it is rotatably journaled to shaft 73 and which is supported by bearing 74. The shafts 73 and bearings 74 are supported by four arms 75 that extend from the drum 63 to which they may be secured through block 62. The hubs are driven through a sprocket wheel 76 keyed to its lower portion. Those three platforms which are located in the washing, rinsing, and drying compartments are slowly rotated by sprocket chain 77 which rides sprocket wheels 76 and is driven in a counterclockwise direction around them by sprocket wheel 78. This sprocket wheel 78 draws the chain away from and out of engagement with the sprocket wheel 76 of that platform in the loading and unloading compartment, allowing it to come to rest for the performance of that operation.

Sprocket wheel 78 is mounted on block 79 which is in turn mounted on a shaft 80 that is journaled by bearings 81 to waterproof framebox 82 on housing 1 and driven by a sprocket wheel 83 pinned to its lower end. The block 79 is machined to overlie the sides of another block 84 which is sealingly secured to the frame box 82 to keep wash or rinse liquid away from the bearings 81 which it contains. Sprocket wheel 83 is turned by sprocket chain 85 which is driven by sprocket wheel 86 mounted on output shaft 87 of speed reducer 88 secured to housing frame 1. This reducer is driven through V-belt 89 and sheave 90 from the motor, pulley and clutch assembly 91 mounted to housing frame 1.

An indexing drive assembly 92 rotates the central turntable 57 counterclockwise on spindle 58. It is provided with an automatic control system to accurately index it 90°, then stop to allow the loading-unloading, washing, rinsing and drying operations to take place and then index again so that the bulkheads 64 are always mated with the partitions 65. A dual sprocket wheel 93 is keyed to a lower extension of shaft 58 and driven through sprocket chain or chains 94 by dual sprocket wheel 95 keyed to the hub 96 of safety friction clutch 97. This clutch is driven from shaft 98 of speed reducer 99 which should be assembled with matched gears to minimize backlash. The speed reducer is driven through shaft 100, flexible coupling 101, magnetic brake 102 and electric motor 103.

Prior to starting the washer, it is connected to the needed utilities; water, electricity, gas and steam. The wash tank 5 is filled and heated to the desired temperature which may be either manually or automatically maintained.

Figure 13:
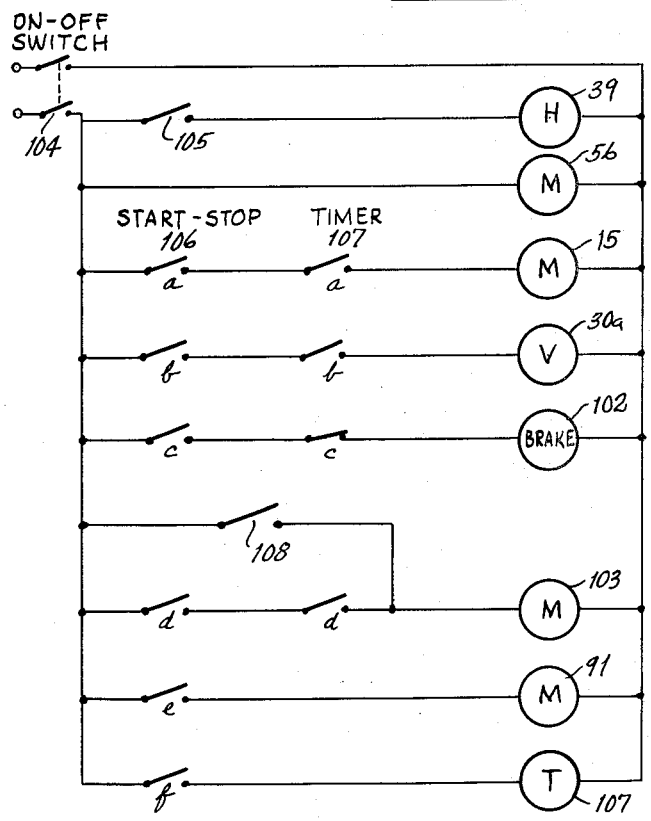
FIG. 13 is a simplified electrical schematic drawing for a part of the FIG. 1 machine.

Referring to a simplified schematic drawing, FIG. 13, the power circuit for the washer and the blower motor 56 is energized by closing the contacts of the on-off switch, and operates to purge the heater system. After a few minutes, switch 105 may be closed, a spark-ignited pilot is lit and it in turn ignites the main burner of the heater 39. This burner automatically shuts off if the pilot is extinguished, the gas pressure goes either above or below a predetermined range, a maximum temperature is exceeded in the circulating air or the blower 43 stops. A thermostat control is provided to regulate gas supply to the burner to maintain a desired circulating air temperature.

After loading the first platform with dirty utensils in compartment 67d, the start button of start-stop switch 106 is depressed and the platform motor 91, timer 107 and, momentarily, brake 102 are energized as contacts 106a–f of an associated relay are closed and sealed in until the stop button of this switch is depressed.

Energized timer 107 opens timer contacts 107c and closes timer contact 107d which releases the brake 102 and operates indexing motor 103 just long enough to effect a 90° rotation of the central turntable 57 which moves the platform loaded with dirty utensils from the loading compartment 67d to the wash compartment 67a. Then, timer contact 107d opens and timer contact 107c closes to stop the turntable and at the same time timer contact 107a closes to start circulating pump motor 15 and a timed wash spray is applied from nozzles 19 to the utensils on the rotary platform in the wash compartment as they are rotated. Likewise, when the central turntable has indexed, timer contact 107b closes to energize and open solenoid controlled valve 30a and start an application of rinse liquid spray to the utensils on the rotating platform in the rinse compartment 67b.

When the washing, rinsing and drying cycles are completed, timer contact 107c opens and timer contact 107d closes to index the turntable 90° counterclockwise and advance each platform 68 to the next compartment whereupon the washing, rinsing and drying cycles automatically repeat. Where one operation takes a little longer than another, all operations must be completed before the turntable can index to its next position.

A selector switch is incorporated in the washer and for the above discussion has been assumed in the "automatic" position. However, when the loading and unloading operation cannot be performed in a small portion of the automatic cycle time, it may be placed in the "manual" position so that the operator must depress the start button (after loading the machine) to allow the machine to recycle. This may be accomplished by placing a timer contact 107e in the seal-in circuit for the relay associated with the start-stop switch which opens just before recycling would begin and placing a selector switch contact in parallel with it which it closed in the "automatic" position.

Should the turntable get out of time so that it does not index to the proper angular positions the machine may be stopped and the switch 108 momentarily closed to jog the turntable and bulkheads 64 into alignment with the partitions 65.

I claim:

1. In combination in a washing machine, a plurality of rotatable platforms for holding articles; for each of said platforms a platform shaft; means for rotating each of said platforms about its shaft; a turntable including a turntable spindle; means for supporting said platforms and platform shafts at substantially equally spaced angular intervals about said turntable spindle; means for supporting and rotating said turntable and thereby said platforms and platform shafts about said turntable spindle; a housing about said plurality of rotatable platforms and means for separating each platform into a compartment while it is being rotated; a receptacle for a wash liquid; means for applying a wash liquid to utensils on one of said platforms while it is rotated while at one station; means for simultaneously receiving from a source and applying a rinse liquid to articles on another of said platforms while at another station while it is rotated and a means for simultaneously receiving and circulating air over articles on another of said platforms while at still another station while it is rotated.

2. In combination in a washing machine, a plurality of rotatable platforms for holding articles; for each of said platforms a substantially vertical platform shaft; means for rotating each of said platforms about its shaft; a turntable including a vertical turntable spindle; means for supporting said platforms and platform shafts at substantially equally spaced angular intervals about said turntable spindle; a plurality of substantially vertical bulkheads and means for supporting said bulkheads about said turntable spindle with one bulkhead located between each of said platforms; a housing substantially enclosing said plurality of platforms; partitions in said housing and at least one partition adapted to substantially mate with each of said bulkheads in succession as the turntable is rotated; means for supporting and indexing said turntable and thereby said platforms, platform shafts and partitions about said turntable spindle so that at least one partition is successively mated with each of said bulkheads; a receptacle for a wash liquid; means for applying wash liquid to articles on one of said platforms while it is rotated while at one station; means for simultaneously receiving from a source and applying a rinse liquid to articles on another of said platforms while it is rotated while at another station; a source of heated air and means for simultaneously circulating said heated air over articles on another of said platforms while it is rotated while at still another station.

3. In combination in a washing machine, four rotatable platforms for holding articles; for each of said platforms a substantially centrally located vertical platform shaft; means for rotating each of said platforms about its shaft which include four sprocket wheels with one of said wheels attached to each of said platforms; a continuous sprocket chain which engages three of said sprocket wheels and which is drawn away from and out of engagement with the fourth of said sprocket wheels; a turntable including a substantially centrally located vertical turntable spindle; means for supporting said platforms and platform shafts at approximately 90° angular intervals about said turntable spindle; four substantially vertical bulkheads and means for supporting said bulkheads about said turntable spindle with one bulkhead located approximately midway between each of said platforms; a housing enclosing said plurality of platforms; partitions in said housing spaced at approximately 90° angular intervals about said turntable spindle and adapted to substantially mate with said bulkheads thereby forming four compartments; means for supporting and indexing said turntable and thereby said platforms, platform shafts and partitions about said turntable spindle so that each platform is successively located in each of said four compartments and so that the partitions successively mate with each of said bulkheads; a receptacle for a wash liquid; means for applying a wash liquid to articles on one of said platforms while it is positioned and rotated in one of said compartments; means for returning a wash liquid to said receptacle after its application to said articles; a source of rinse liquid; means for simultaneously applying a rinse liquid to said articles on another of said platforms while it is positioned and rotated in another of said compartments; an air heater; means for simultaneously circulating heated air from said heater over said articles on another of said platforms while it is positioned and rotated in another of said compartments; and means for positioning another of said platforms in another of said compartments so that it may be loaded and unloaded while stationary.

4. In combination in a washing machine, four rotatable platforms for holding articles; for each of said platforms a substantially centrally located vertical platform shaft; means for rotating each of said platforms about its shaft which include four sprocket wheels with one of said wheels attached to each of said platforms; a continuous sprocket chain which engages three of said sprocket wheels and which is drawn away from and out of engagement with the fourth of said sprocket wheels; a turntable including a substantially centrally located vertical turntable spindle; means for supporting said platforms and platform shafts at approximately 90° angular intervals about said turntable spindle; four substantially vertical bulkheads and means for supporting said bulkheads about said turntable spindle with one bulkhead located approximately midway between each of said platforms; a housing enclosing said plurality of platforms; partitions in said housing spaced at approximately 90° angular intervals about said turntable spindle and adapted to substantially mate with said bulkheads thereby forming four compartments; means for automatically supporting and indexing said turntable and thereby said platforms, platform shafts, and partitions about said turntable spindle so that each platform is successively located in each of said four compartments and so that the partitions successively mate with each of said bulkheads; a receptacle for a wash liquid; automatic means for applying a wash liquid to articles on one of said platforms while it is positioned and rotated in one of said compartments;

means for returning a wash liquid to said receptacle after its application to said articles; a source of rinse liquid; automatic means for applying a rinse liquid to said articles on another of said platforms while it is positioned and rotated in another of said compartments simultaneously with said application of the wash liquid; an air heater; automatic means for circulating heated air from said heater over articles on another of said platforms while it is positioned in another of said compartments simultaneously with said application of the wash liquid; means for positioning another of said platforms in another of said compartments so that it may be loaded and unloaded while stationary and simultaneously with said application of the wash liquid.

5. The combination of claim 4 in which said platforms and said turntable are rotated in the same sense and in which the speed at which said three platforms rotate about said platform shafts is reduced as the turntable indexes them to position in their successive compartments, respectively, while the linear speed of said sprocket chain is maintained.

References Cited in the file of this patent

UNITED STATES PATENTS

| | | |
|---|---|---|
| 542,460 | Blakeslee | July 9, 1895 |
| 1,147,164 | Haggerty et al. | July 20, 1915 |
| 1,313,703 | Lambert | Aug. 19, 1919 |
| 1,939,308 | McEwan | Dec. 12, 1933 |
| 2,189,451 | Peters | Feb. 6, 1940 |
| 2,703,580 | Cole | Mar. 8, 1955 |

FOREIGN PATENTS

| | | |
|---|---|---|
| 233,219 | Germany | Apr. 3, 1911 |